United States Patent
Sano

[11] Patent Number: 5,376,926
[45] Date of Patent: Dec. 27, 1994

[54] LIQUID CRYSTAL DRIVER CIRCUIT

[75] Inventor: Yoshiki Sano, Kashihara, Japan

[73] Assignee: Sharp Kabushiki Kaisha, Osaka, Japan

[21] Appl. No.: 929,005

[22] Filed: Aug. 13, 1992

[30] Foreign Application Priority Data

Aug. 29, 1991 [JP] Japan .................... 3-244916

[51] Int. Cl.⁵ .................................. H04N 1/40
[52] U.S. Cl. ............................ 345/89; 345/98
[58] Field of Search ............... 307/241, 242, 243; 359/115; 340/802, 803, 794; 345/89, 147, 208

[56] References Cited

U.S. PATENT DOCUMENTS

| | | | |
|---|---|---|---|
| 3,950,743 | 4/1976 | Hatano et al. | 340/803 |
| 3,958,151 | 5/1976 | Yano et al. | 340/803 |
| 3,971,011 | 7/1976 | Burchert | 340/803 |
| 4,099,171 | 7/1978 | Meyer | 340/803 |
| 4,135,182 | 1/1979 | Beil et al. | 340/803 |
| 4,149,150 | 4/1979 | Miyakawa et al. | 340/803 |
| 4,394,653 | 7/1983 | Breeze | 340/802 |
| 4,427,978 | 1/1984 | Williams | 345/89 |
| 4,859,998 | 8/1989 | Kawamura et al. | 345/89 |
| 5,061,861 | 10/1991 | Sameshima et al. | 307/241 |
| 5,061,920 | 10/1991 | Nelson | 345/89 |
| 5,068,649 | 11/1991 | Garrett | 345/147 |
| 5,072,439 | 12/1991 | Forrest et al. | 359/115 |
| 5,130,704 | 7/1992 | Ogawa et al. | 340/803 |
| 5,162,672 | 10/1992 | McMahan et al. | 307/241 |
| 5,196,738 | 3/1993 | Takahara et al. | 345/89 |
| 5,266,936 | 11/1993 | Saitoh | 345/89 |

FOREIGN PATENT DOCUMENTS 59-126512 7/1984 Japan .

Primary Examiner—Raymond A. Nelli
Assistant Examiner—Thomas Moulis

[57] ABSTRACT

A liquid crystal driver circuit is arranged to select one of a plurality of different reference voltages in response to externally input through the effect of a multiplexer circuit. The liquid crystal driver further provides a buffer circuit at an output stage of the multiplexer circuit, arranged in a manner that its impedance is high at an input and low at an output to thereby lower an output impedance of the liquid crystal driver circuit.

5 Claims, 3 Drawing Sheets

LIQUID CRYSTAL DRIVER CIRCUIT

BACKGROUND OF THE INVENTION

1. Field of the Invention

The present invention relates to a liquid crystal driver circuit which may apply to a liquid crystal display unit.

2. Description of the Related Art

The inventors of the present application know of a liquid crystal driver circuit which is arranged as an 8-level gradation digital system which operates so that one of eight reference voltages may be selected by an analog switch in accordance with three pieces of data fed from the outside of the circuit and the selected reference voltage may then be output.

A recent trend exists wherein liquid crystal display devices are being made larger and larger in size. The liquid crystal driver circuit is requested to suppress an output impedance accordingly. The known circuit is, as mentioned above, arranged so that its output impedance is defined by the analog switch. In order to lower its output impedance, hence, the larger transistor is employed for composing the analog switch.

With the foregoing method for towering the output impedance, however, as the transistor becomes larger, the overall circuit chip is increased in size. In particular, a large liquid crystal display unit needs a lot of Liquid crystal driver circuits. If the necessary driver circuits using larger transistors are integrated on one chip, the overall circuit chip size is made much larger. This presents a large obstacle to lowering the cost and the reducing power consumption.

SUMMARY OF THE INVENTION

It is an object of the present invention to create a liquid crystal driving circuit which is capable of lowering its impedance at the output and which keeps the overall circuit chip as small as possible.

In carrying out the object, the liquid crystal driver circuit according to the present invention is arranged so that one of a plurality of different reference voltages may be selected by a multiplexer circuit according to externally input data and the selected reference voltage may be output. The multiplexer circuit is provided with a buffer circuit at the output stage for lowering its output impedance, That is, unlike the known circuit, the overall circuit chip area is made larger only by the area of the buffer circuit without having to increase the transistor composing the multiplexer circuit in size. In other words, the circuit of this invention is capable of lowering its output impedance, and still is able to keep as keeping the chip size as small as possible. In particular, a large liquid crystal display unit needs a lot of liquid crystal driver circuits. In a case that these necessary driver circuits are integrated on one chip, the chip size can be made quite small. This is a large step in lowering the cost and reducing the power consumption. For example, if the liquid crystal display unit employs 16 levels of gradation, assuming that the chip size of the known circuit is 100, the chip size of the circuit according to the invention can be reduced to 83.6. It means that the latter chip size is reduced by 16.4%.

Further objects and advantages of the present invention will be apparent from the following description of the preferred embodiments of the invention as illustrated in the accompanying drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The description will be directed to a liquid crystal driver circuit according to an embodiment of the present invention as referred to the drawings.

Figure 1:
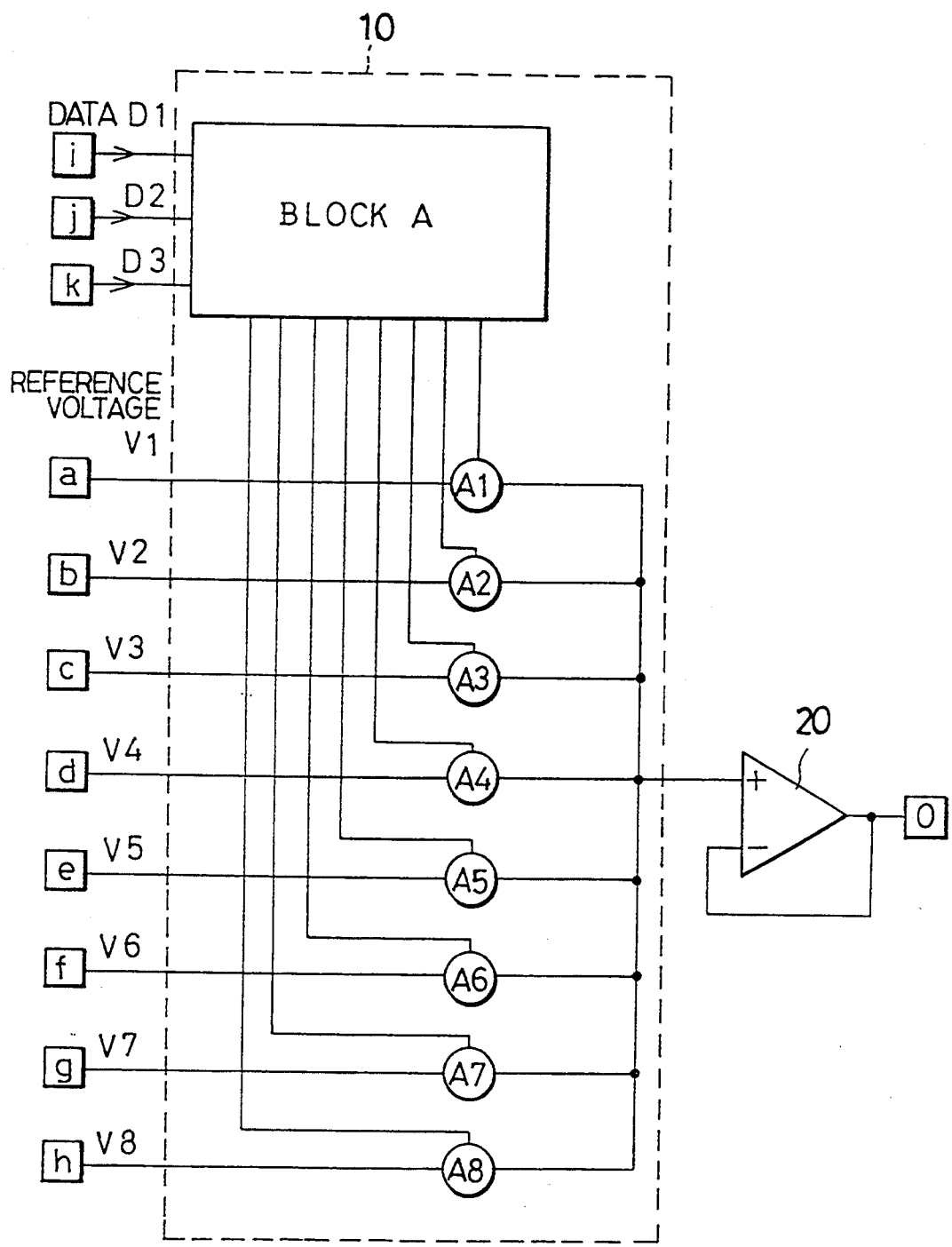
FIG. 1 is a circuit diagram showing a liquid crystal driver according to an embodiment of the invention.

FIG. 1 is a circuit diagram showing the liquid crystal driver of this embodiment. As shown, the liquid crystal driver circuit is arranged as an 8-level gradation digital system. Characters a to h denote terminals to which different reference voltages V1 to V8 are applied respectively. The output stages of the terminals a to h are respectively connected to the analog switches A1 to A8 composing a multiplexer circuit 10.

The multiplexer circuit 10 is arranged to have the analog switches A1 to A8 and a block A in an 8-input and 1-output mariner. Each of three-bits of data D1 to D3 is received at the terminals i to k and then is led into an input of the block A. The block A is a logic circuit for a decoder for generating a signal for selecting any one of the analog switches A1 to A8 based on the input data D1 to D3.

Figure 2:
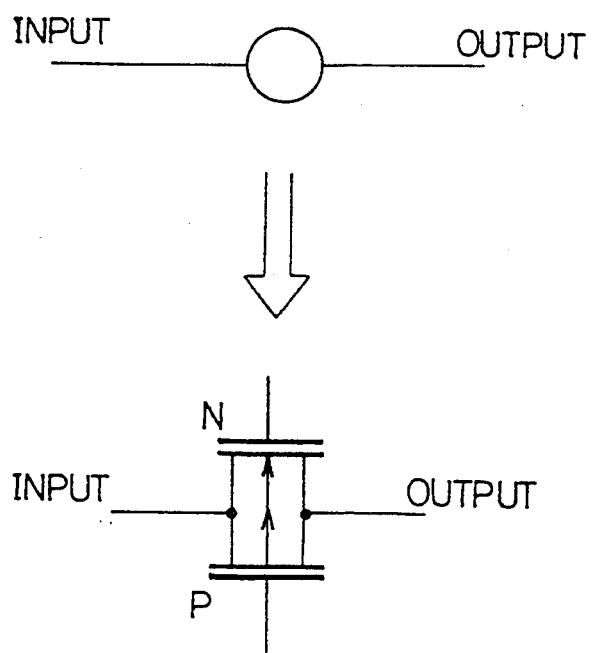
FIG. 2 is a diagram showing an analog switch included in the liquid crystal driver shown in FIG. 1.

Each of the analog switches A1 to A8 is a transmission gate made of a p-channel MOS transistor and an n-channel MOS transistor as shown in FIG. 2. The drain of the n-channel MOS transistor is connected to a source of the p-channel MOS transistor and the source of the n-channel MOS transistor is connected to a drain of the p-channel MOS transistor. The former contact between the drain and the source is an input of an analog switch and is connected to a reference voltage input terminal. The latter contact between the source and the drain is an output of the analog switch. The block A applies a selecting signal to a gate of the n-channel MOS transistor and its inversion signal to a gate of the p-channel MOS transistor. Hence, if the selecting signal is input from the block A, the n-channel MOS transistor and the p-channel MOS transistor are both made conductive so that the voltage applied at the reference voltage input terminal is output.

That is to say, the multiplexer circuit 10 serves to select one of the reference voltages V1 to V8 according to the data D1 to D3 and output the selected reference voltage to a buffer circuit 20 (to be described later).

The buffer circuit 20 is composed of a two-input differential amplifier such as an operational amplifier having a plus side connected to a common output of the analog switches A1 to A8 and a minus input connected to an output of the buffer circuit 20 itself. As a result, the buffer circuit 20 has a high impedance at the input and a low impedance at the output. The output of the amplifier is applied to a liquid crystal device (not shown).

Figure 3:
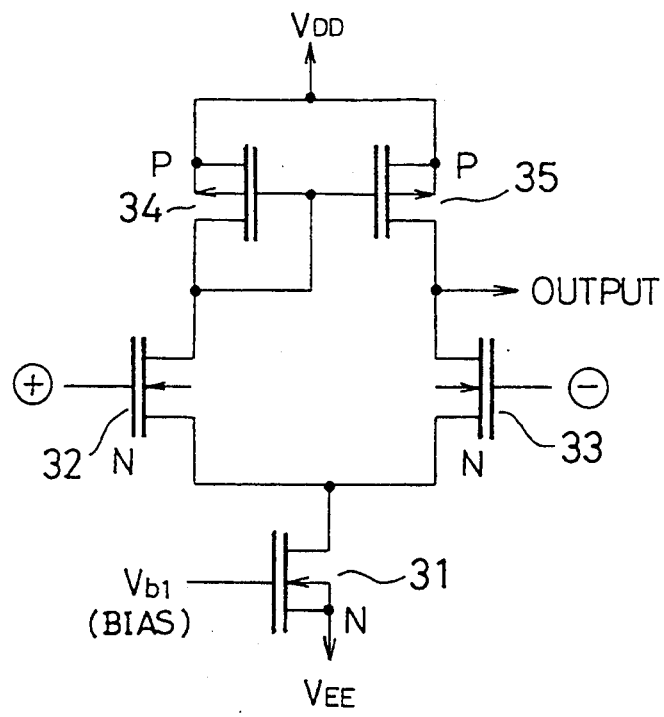
FIG. 3 is a diagram showing a two-input differential amplifier included in the liquid crystal driver shown in FIG. 1.
Figure 4:
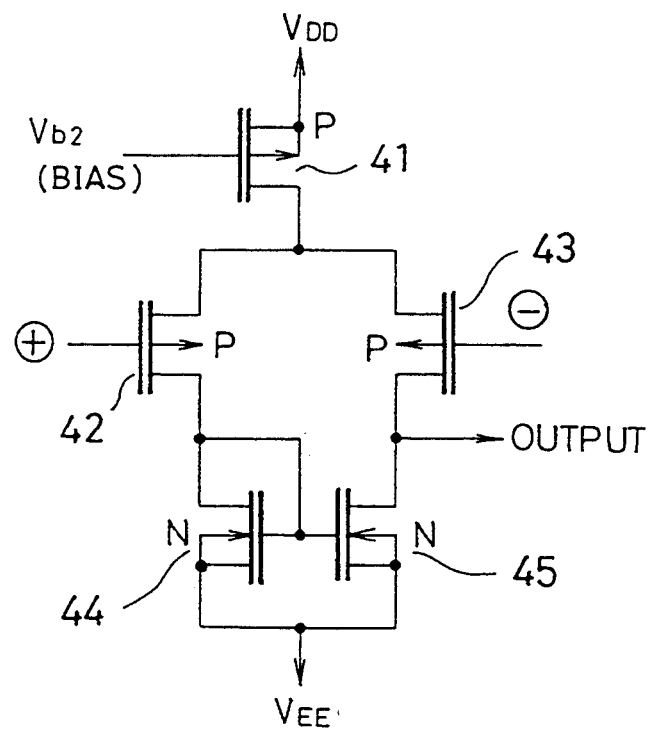
FIG. 4 is a diagram showing another two-input differential amplifier included in the liquid crystal driver shown in FIG. 1.

Examples of the two-input differential amplifier are shown in FIGS. 3 and 4. The amplifier shown in FIG. 3 is arranged to have an n-channel MOS transistor 31 serve as a constant current source, two n-channel MOS transistors 32, 33 serve as a differential amplifying section, and two p-channel MOS transistors 34, 35 serve as dynamic load. The source of the n-channel MOS transistor 31 is connected to a supply voltage VEE and the drain of the n-channel MOS transistor 31 is connected to the sources of the n-channel MOS transistors 32, 33. A bias voltage Vb1 is applied to a gate of the n-channel MOS transistor 31. The drains of the n-channel MOS transistors 32, 33 are connected to the drains of the p-channel MOS transistors 34, 35, respectively. The gate of the n-channel MOS transistor 32 serves as a plus side input and the gate of the n-channel MOS transistor 33 serves as a minus side input. The drain of the n-channel MOS transistor 33 is connected to the gates of the p-channel MOS transistors 34, 35. The drain of the n-channel MOS transistor 33 serves as an output. A supply voltage VDD is applied to the sources of the p-channel MOS transistors 34, 35.

The amplifier shown in FIG. 4 is arranged to have a p-channel. MOS transistor 41 served as a constant current source, two p-channel MOS transistors 42, 43 served as a differential amplifying section, and two n-channel MOS transistors 44, 45 served as dynamic load. The source of the p-channel MOS transistor 41 is connected to the supply voltage VDD. The drain of the p-channel MOS transistor 41 is connected to the source of the p-channel MOS transistors 42, 43. A bias voltage Vb1 is applied to the gate of the p-channel MOS transistor 41. The drains of the p-channel MOS transistors 42, 43 are connected to the drains of the n-channel MOS translators 44, 45, respectively. The gate of the p-channel MOS transistor 42 serves as a plus input and the gate of the p-channel serves as a minus input. The drain of the p-channel MOS transistor 42 is connected to the gates of the n-channel MOS transistors 44, 45. The drain of the p-channel MOS transistor 43 serves as an output. A supply voltage VEE is applied to the sources of the n-channel MOS transistors 44, 45.

The buffer circuit 20 is created by the above-mentioned circuits or an operational amplifier so as to have a high impedance at the input and a low impedance at the output.

The liquid crystal driver circuit according to this embodiment is arranged to have a buffer circuit 20 having a low impedance at the output so that the output impedance of the overall circuit may be quite low. Unlike the known circuit, therefore, it is not necessary to increase the size of each transistor composing analog switches A1 to A8. In particular, if the number of gradations is increased, the necessary buffer circuit 20 is just one. The circuit integrated on the chip can be greatly reduced in size. The current flowing through each analog switch is made smaller, resulting in reducing the overall current consumption.

The liquid crystal driver circuit according to this invention is not limited to the foregoing arrangement having an operational amplifier. Any circuit may be used if it can provide a low impedance at the output. It goes without saying that the used gradations and reference voltages are not restricted to 8.

Many widely different embodiments of the present invention may be constructed without departing from the spirit and scope of the prevent invention. The invention may be varied in many ways and such variation should not be regarded as a departure from the spirit and scope of the invention. It should be understood that the present invention is not limited to the specific embodiments described in the specification, and all such modifications as would be obvious to one skilled in the art are intended to be included within the scope of appended claims.

What is claimed is:

1. A liquid crystal driver circuit for supplying one of a plurality of different reference voltages to a liquid crystal display device to permit gradation display, selected in response to externally input data, comprising:

a multiplexer for selecting and outputting one of the plurality of different reference voltages in response to the externally input data, the multiplexer including, a decoder, connected to receive said externally input data, for generating selection signals, and a plurality of analog switches, each connected to receive one of said plurality of different reference voltages, said plurality of analog switches being controlled based upon said selection signals, wherein output terminals of the plurality of analog switches are commonly connected and each analog switch includes a pair of transistors; and an impedance transforming circuit, connected to said commonly connected output terminals of the plurality of analog switches, having a relatively high impedance at an input and a relatively low impedance at an output for transforming an output impedance of the liquid crystal driver circuit irrespective of the size of the transistors of the analog switches.

2. The liquid crystal driver circuit as claimed in claim 1, wherein said impedance transforming circuit includes a two-input differential amplifier having a plus side input connected to the common output of said analog switches and a minus side input connected to the output of the impedance transforming circuit.

3. This liquid crystal driver circuit of claim 2, wherein the differential amplifier includes a constant current source, a differential amplifier section, and a dynamic load.

4. This liquid crystal driver circuit of claim 3, wherein the constant current source includes a p-channel MOS transistor, the differential amplifier section includes two p-channel MOS transistors, and the dynamic load includes two n-channel MOS transistors.

5. The liquid crystal driver circuit of claim 3, wherein the constant current source includes an n-channel MOS transistor, the differential amplifier section includes two n-channel MOS transistors, and the dynamic load includes two p-channel MOS transistors.

* * * * *